United States Patent
Poulsen

(10) Patent No.: US 7,249,535 B2
(45) Date of Patent: Jul. 31, 2007

(54) TWO-DIMENSIONAL DISPLACEMENT APPARATUS

(75) Inventor: Anders Poulsen, Holte (DK)

(73) Assignee: Hasselblad A/S, Copenhagen (DK)

( * ) Notice: Subject to any disclaimer, the term of this patent is extended or adjusted under 35 U.S.C. 154(b) by 0 days.

(21) Appl. No.: 11/087,725

(22) Filed: Mar. 24, 2005

(65) Prior Publication Data

US 2005/0217402 A1    Oct. 6, 2005

Related U.S. Application Data

(63) Continuation of application No. PCT/DK03/00614, filed on Sep. 22, 2003.

(30) Foreign Application Priority Data

Sep. 24, 2002  (DK) ............................... 2002 01408

(51) Int. Cl.
*G05G 11/00* (2006.01)
(52) U.S. Cl. .................. 74/490.09; 74/490.11
(58) Field of Classification Search ............. 74/490.09, 74/490.1, 490.11
See application file for complete search history.

(56) References Cited

U.S. PATENT DOCUMENTS

| 2,865,696 | A | * | 12/1958 | Mooser | 108/8 |
| 3,664,016 | A | * | 5/1972 | Sevc et al. | 29/407.1 |
| 6,571,630 | B1 | * | 6/2003 | Weinberg et al. | 73/504.16 |
| 6,585,445 | B1 | * | 7/2003 | Goldfarb et al. | 403/344 |
| 6,975,061 | B2 | * | 12/2005 | Moler | 310/328 |
| 2002/0136485 | A1 | * | 9/2002 | Reed et al. | 385/18 |
| 2004/0080730 | A1 | * | 4/2004 | Binnard | 355/53 |
| 2004/0125472 | A1 | * | 7/2004 | Belt | 359/847 |

* cited by examiner

*Primary Examiner*—David M. Fenstermacher

(74) *Attorney, Agent, or Firm*—Lee & Morse, P.C.

(57) ABSTRACT

A displacement apparatus for two-dimensional displacement of an object in relation to a fix-point includes a frame that is symmetrical in relation to a center of the frame and adapted to receive first and second actuators, each of which exerts a force along respective first and second axes extending through the center of the frame for deformation of respective first and second specific parts of the frame.

20 Claims, 4 Drawing Sheets

TWO-DIMENSIONAL DISPLACEMENT APPARATUS

CROSS-REFERENCE TO RELATED APPLICATIONS

The present application is a continuation application of International Application No. PCT/DK2003/000614, filed on Sep. 22, 2003, the entire contents of which are incorporated herein by reference for all purposes.

BACKGROUND OF THE INVENTION

1. Field of the Invention

The present invention relates to a high precision two-dimensional displacement apparatus suitable for displacement or positioning of an object, such as a CCD chip in a digital camera or a digital scanner, an optical fiber, a microscope object, etc.

2. Description of Related Art

Apparatuses for two-dimensional displacement of an object, e.g., utilizing piezo-actuators, are well-known in the art. However the known apparatuses have different characteristics, e.g., temperature sensitivity, in the two dimensions and/or have significant distances between the object to be displaced and points of application of forces causing the displacement, whereby the obtainable displacement accuracy and stability is limited.

SUMMARY OF THE INVENTION

The present invention is therefore directed to a two-dimensional displacement apparatus, which substantially overcomes one or more of the problems due to the limitations and disadvantages of the related art.

It is therefore a feature of an embodiment of the present invention to provide a displacement apparatus that is symmetric.

It is another feature of the present invention to provide a displacement apparatus with a minimum distance between points of application of forces causing displacement and the object to be displaced.

It is yet another feature of the present invention to provide a displacement apparatus wherein substantially no torque is exerted.

At least one of the above and other features and advantages may be realized by a displacement apparatus for two-dimensional displacement of an object in relation to a fix-point, including a frame that is symmetrical in relation to a center of the frame and adapted to receive first and second actuators, each of which exerts a force along respective first and second axes extending through the center of the frame for deformation of respective first and second specific parts of the frame.

Because of the frame symmetry, the apparatus inherently has substantially identical characteristics, such as displacement accuracy, temperature sensitivity, vibration sensitivity, etc, in both dimensions.

Preferably, the displacement apparatus is adapted to displace the center of the frame in relation to the fix-point. Thus, one of the first and second actuators may exert a force causing the frame to be displaced in relation to the fix-point while the other of the first and second actuators may exert a force causing displacement of a member in relation to the frame. Hereby, no parts of the apparatus experience forces in both dimensions, i.e., no torque is exerted by the actuators on any part of the apparatus.

The frame may include a first beam extending along the first axis, and a second beam extending along the second axis, each of the beams being adapted to receive one of the first and second actuators.

Further, each of the first and second beams extends beyond the center of the frame so that the frame constitutes a cross. The cross may be symmetrical in relation to a center of the cross.

The first and second beams may be adapted to receive respective first and second resilient members, such as springs, for exerting forces along the respective first and second axes.

Further, the first and second actuators and the first and second resilient members may be positioned symmetrically in relation to the center of the frame. The symmetry causes the apparatus to have substantially identical temperature sensitivities along the two dimensions.

In another embodiment of the invention, the first and second beams are adapted to receive respective third and fourth actuators for exerting forces along the respective first and second axes. The first, second, third and fourth actuators may be positioned symmetrically in relation to the center of the frame.

This leads to a compensation of temperature sensitivity of the actuators leading to an apparatus with a minimum temperature sensitivity.

Preferably, the object is positioned substantially symmetrically in relation to the center of the frame for the full exploitation of the symmetry of the apparatus.

In an embodiment of the invention, the fix-point is situated in a moving plane of the object.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF PREFERRED EMBODIMENTS

Figure 2:
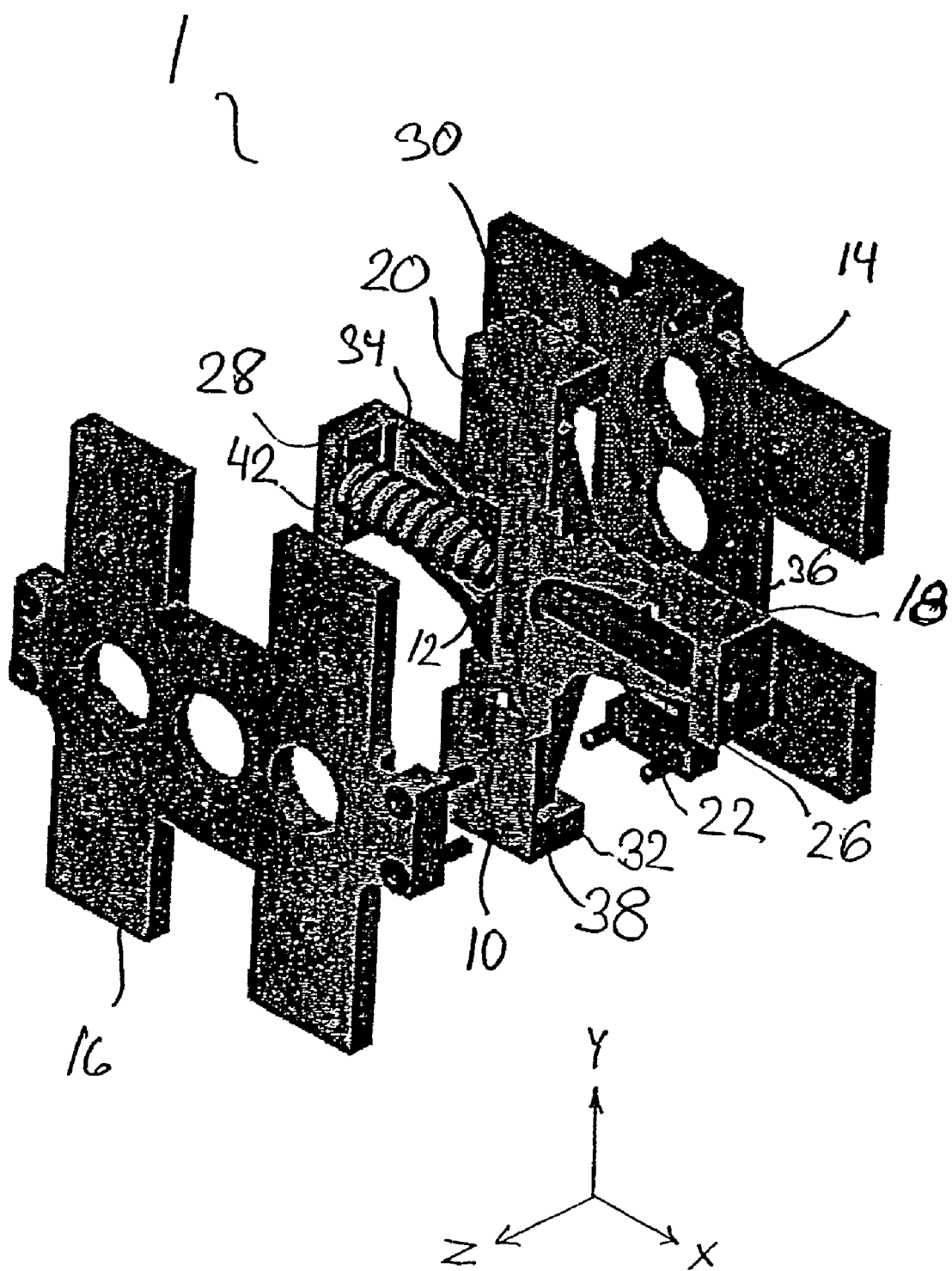
FIG. 2 illustrates an exploded perspective view of the embodiment shown in FIG. 1.

The operational principles of the invention will now be explained with reference to FIG. 2. FIG. 2 is an exploded view of a displacement apparatus 1 for two-dimensional displacement of an object according to an embodiment of the present invention. X, Y and Z directions are also indicated in FIG. 2. The apparatus 1 includes a frame 10 that is symmetrical in relation to a center 12 of the frame 10. Members 14, 16 are adapted to be mounted and fixed to opposite sides of the frame 10. It should be noted that this embodiment of the invention is also symmetrical with respect to a X-Y-plane comprising the displacement axes of the apparatus. Thus, each of the members 14, 16 may contain the fix-point. In the present example, member 14 contains the fix-point.

The frame 10 includes a first beam 18 extending along the first axis (the x-axis), and a second beam 20 extending along the second axis (the y-axis). Each of the beams 18, 20 is adapted to receive a respective actuator 22, 24 (the actuator 24 positioned in the second beam 20 is not shown in FIG. 2). The beams 18, 20 may have a U-shaped cross-section along their respective longitudinal directions, i.e., the beams have end parts 26, 28, 30, 32 that extend along the z-axis perpendicular to the longitudinal direction of the remaining part of the beams 18, 20. It should be noted that end parts 26, 28 of the first beam 18 extend in the positive z-direction while the end parts 30, 32 of the second beam 20 extend in the negative z-direction, whereby the displacement plane of the object is separated from a plane containing the fix-point.

Each of the actuators 22, 24 is clamped between a respective end part and a central part 8 of the frame 10. Further, weakenings 34, 36, 38, 40 are provided at the junctions between respective end parts and longitudinal extending parts of the beams 18, 20. At the weakenings, the thickness of the beams are reduced considerably so that deflections caused by forces exerted by the actuators 22, 24 take place at the weakenings and substantially at the weakenings 34, 36, 38, 40 only. As shown in the FIG. 2, a resilient member 42, 44, e.g., a spring, may be mounted in the beams 18, 20 on one side of the center 12 of the frame 10 for pre-stressing of the frame 10 while the force for displacement is exerted by the actuator mounted in the same beam 18, 20 on the opposite side of the center 12. The actuators may be piezo-electric actuators. Preferably, the piezo-electric actuators are pre-stressed by 30-40 kp.

In another embodiment of the invention, the resilient members 42, 44 are exchanged with third and fourth actuators for exerting forces along the respective first and second axes for provision of a symmetrically actuated apparatus.

For the above-mentioned embodiments, the thickness of the frame 10 at the weakenings 34, 36, 38, 40 may be reduced until the yield point of the frame material is approached for the exerted forces in question.

In still another embodiment of the invention, no member is mounted in the beams 18, 20 opposite the actuators, rather the resilience is provided by the weakenings 36, 40 of the beams 18, 20. For this embodiment, the frame thickness at the weakenings 36, 40 is determined by the required resilience.

It is noted that the first and second actuators 22, 24 exert forces along respective longitudinal axes of the respective beams 18, 20 and extending through the center 12 of the frame 10 for deformation of respective end parts of the frame 10.

When the second actuator 24 (hidden in FIG. 2) is controlled to change its length, the end parts 30, 32 are deflected accordingly, and the frame 10 with the member 16 is displaced accordingly in relation to the member 14 (with the fix-point) in the x-direction. The object, e.g., a CCD chip, is mounted on the member 16, preferably at the center of member 16, and even more preferred mounted symmetrically in relation to the center of the member 16, and thus, also in relation to the center 12 of the frame 10.

Further if the first actuator 22 is controlled to change its length, the end parts 26, 28 are deflected accordingly, and the member 16 is displaced accordingly in relation to the frame 10 and the member 14 in the y-direction perpendicular to the x-direction.

Figure 1:
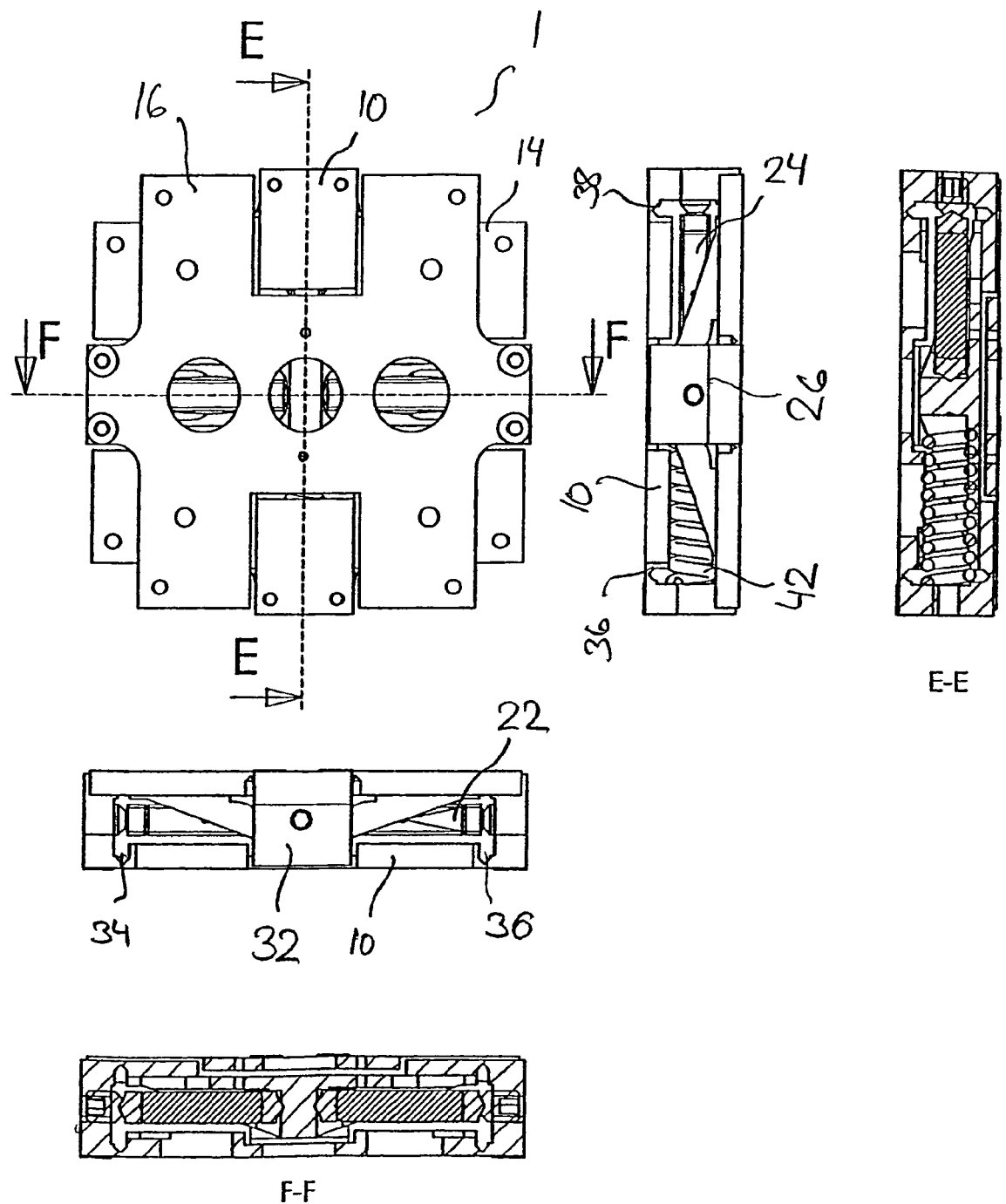
FIG. 1 illustrates a top view, side-elevation views, and various cross-sections of an embodiment of the present invention.

FIG. 1 shows a top view, side-elevation views, and cross-sections of the displacement apparatus shown in FIG. 2.

Figure 3:
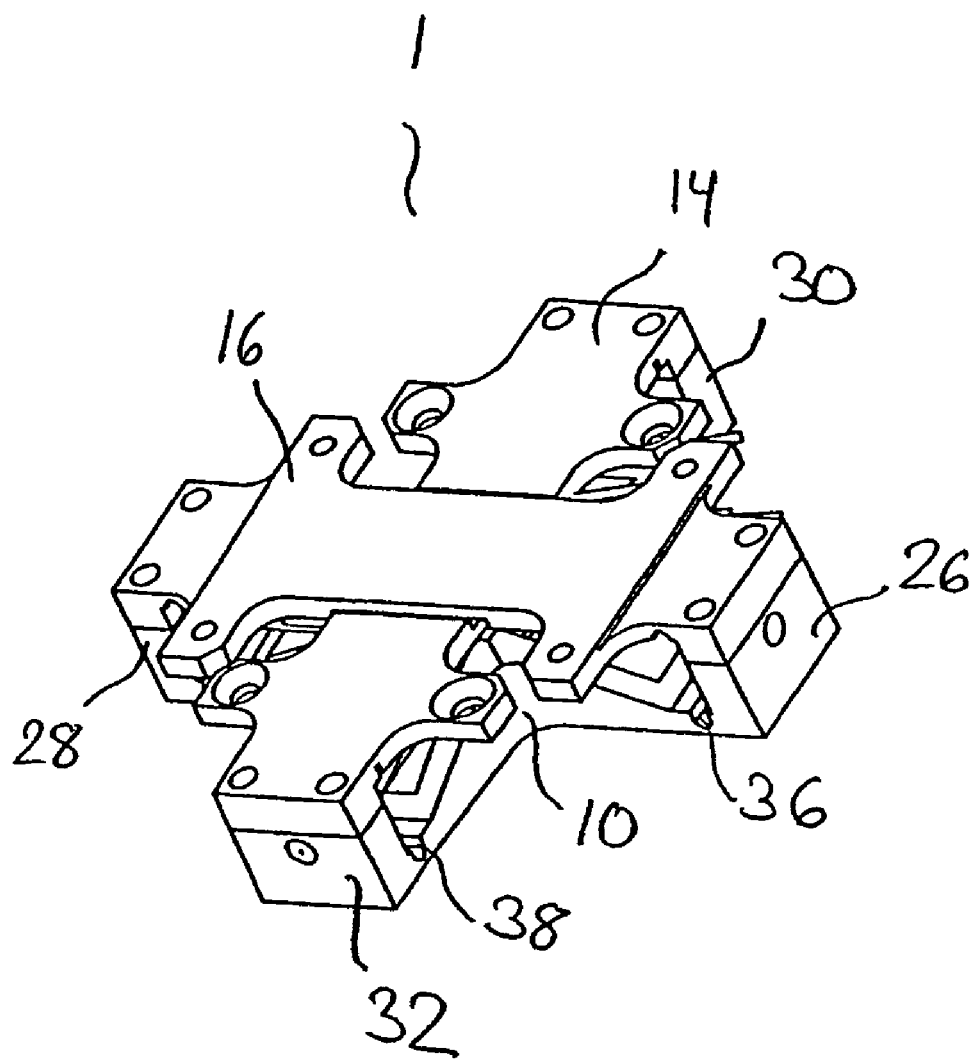
FIG. 3 illustrates a perspective view of another embodiment of the present invention.
Figure 4:
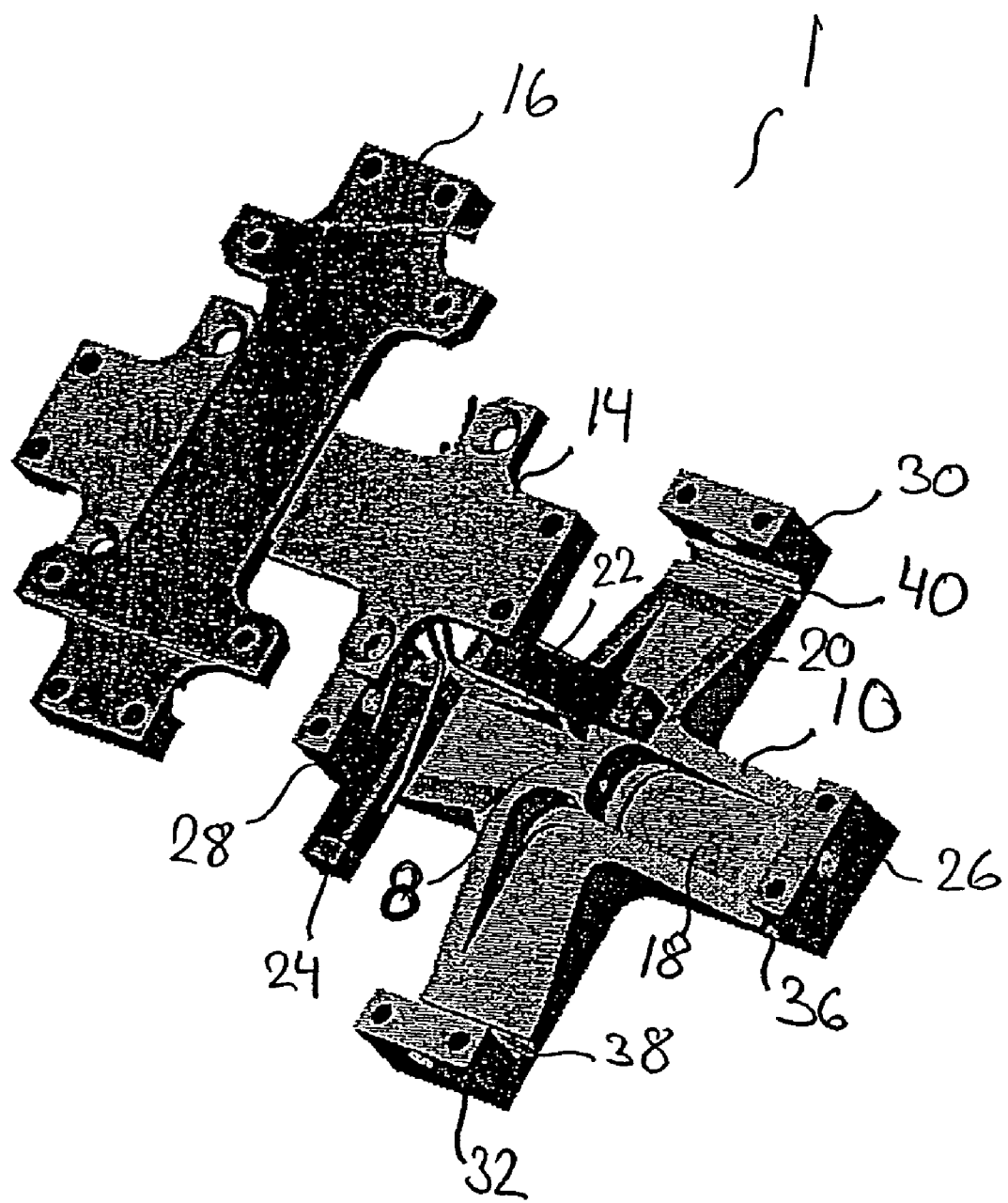
FIG. 4 illustrates an exploded perspective view of the embodiment shown in FIG. 3.

FIGS. 3 and 4 illustrate another embodiment of the invention. Corresponding parts in the figures are designated by the same reference numerals.

In the embodiment of FIGS. 3 and 4, all of the end parts 26, 28, 30, 32 extend in the same direction whereby the members 14, 16 is mounted to the frame 10 in the same plane so that the fix-point is situated in a moving plane of the object to be mounted on member 16.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims

What is claimed is:

1. A displacement apparatus for two-dimensional displacement of an object in relation to a fix-point, comprising a frame that is symmetrical in relation to a center of the frame and adapted to receive first and second actuators, each of which exerts a force along respective first and second axes extending through the center of the frame for deformation of respective first and second specific parts of the frame displacing the object in a plane different from the plane defined by the first and second axes.

2. The displacement apparatus as claimed in claim 1 that is adapted to displace the center of the frame in relation to the fix-point.

3. The displacement apparatus as claimed in claim 1, wherein the frame further comprises a first beam extending along the first axis, and a second beam extending along the second axis, each of the beams being adapted to receive one of the first and second actuators.

4. The displacement apparatus as claimed in claim 3, wherein each of the first and second beams extends beyond the center of the frame.

5. The displacement apparatus as claimed in claim 4, wherein the first and second beams are adapted to receive respective first and second resilient members for exerting forces along the respective first and second axes.

6. The displacement apparatus as claimed in claim 5, wherein the first and second actuators and the first and second resilient members are positioned symmetrically in relation to the center of the frame.

7. The displacement apparatus as claimed in claim 4, wherein the first and second beams are adapted to receive respective third and fourth actuators for exerting forces along the respective first and second axes.

8. The displacement apparatus as claimed in claim 7, wherein the first, second, third and fourth actuators are positioned symmetrically in relation to the center of the frame.

9. The displacement apparatus as claimed in claim 1, wherein the object is positioned substantially symmetrically in relation to the center of the frame.

10. The displacement apparatus as claimed in claim 1, wherein the fix-point is situated in a moving plane of the object.

11. The displacement apparatus as claimed in claim 2, wherein the frame further comprises a first beam extending along the first axis, and a second beam extending along the second axis, each of the beams being adapted to receive one of the first and second actuators.

12. The displacement apparatus as claimed in claim 11, wherein each of the first and second beams extends beyond the center of the frame.

13. The displacement apparatus as claimed in claim 12, wherein the first and second beams are adapted to receive respective first and second resilient members for exerting forces along the respective first and second axes.

14. The displacement apparatus as claimed in claim 13, wherein the first and second actuators and the first and second resilient members are positioned symmetrically in relation to the center of the frame.

15. The displacement apparatus as claimed in claim 12, wherein the first and second beams are adapted to receive respective third and fourth actuators for exerting forces along the respective first and second axes.

16. The displacement apparatus as claimed in claim 15, wherein the first, second, third and fourth actuators are positioned symmetrically in relation to the center of the frame.

17. The displacement apparatus as claimed in claim 2, wherein the object is positioned substantially symmetrically in relation to the center of the frame.

18. The displacement apparatus as claimed in claim 2, wherein the fix-point is situated in a moving plane of the object.

19. A displacement apparatus for two-dimensional displacement of an object in relation to a fix-point, comprising a frame that is symmetrical in relation to a center of the frame and adapted to receive first and second actuators, each of which exerts a force along respective first and second axes extending through the center of the frame for deformation of respective first and second specific parts of the frame, the frame being symmetric along at least one of the first and second axes.

20. The displacement apparatus as claimed in claim 19, wherein the frame is symmetric along both the first and second axes.

* * * * *